(12) United States Patent
Shin et al.

(10) Patent No.: US 10,312,709 B2
(45) Date of Patent: Jun. 4, 2019

(54) MULTI-CONFIGURABLE SWITCH MODE CHARGING SYSTEM, CHARGING CIRCUIT, AND CHARGING METHOD

(71) Applicant: Silicon Mitus, Inc., Seongnam-si (KR)

(72) Inventors: Ho Jun Shin, Palo Alto, CA (US); Kang Yoon Lee, Seoul (KR); Kwang Muk Choi, Seoul (KR); Ii Kwon Jang, Gyeonggi-do (KR); Han Suk Seo, Seoul (KR); Hyung Gu Park, Seoul (KR); Young Jun Park, Gyeongsangbuk-do (KR); Seong Jin Oh, Gyeonggi-do (KR); Ju Hyun Park, Seoul (KR); Jung Yeon Kim, Gyeonggi-do (KR)

(73) Assignee: Silicon Mitus, Inc. (KR)

( * ) Notice: Subject to any disclaimer, the term of this patent is extended or adjusted under 35 U.S.C. 154(b) by 30 days.

(21) Appl. No.: 15/652,807

(22) Filed: Jul. 18, 2017

(65) Prior Publication Data

US 2018/0026467 A1 Jan. 25, 2018

(30) Foreign Application Priority Data

Jul. 19, 2016 (KR) .................. 10-2016-0091227

(51) Int. Cl.
*H02J 7/00* (2006.01)

(52) U.S. Cl.
CPC .......... *H02J 7/0068* (2013.01); *H02J 7/0029* (2013.01); *H02J 7/0052* (2013.01); *H02J 7/0081* (2013.01); *H02J 2007/006* (2013.01); *H02J 2007/0059* (2013.01); *H02J 2007/0096* (2013.01); *Y02B 40/90* (2013.01)

(58) Field of Classification Search
CPC ..................................... H02J 7/0068
USPC ....................................... 320/107
See application file for complete search history.

(56) References Cited

U.S. PATENT DOCUMENTS

| | | | |
|---|---|---|---|
| 2015/0003176 A1* | 1/2015 | Spinks | G11C 11/4076 365/194 |
| 2015/0069951 A1* | 3/2015 | Wang | H02J 7/0052 320/107 |
| 2015/0254206 A1* | 9/2015 | Biskup | G06F 13/4068 710/110 |

* cited by examiner

*Primary Examiner* — Suresh Memula
(74) *Attorney, Agent, or Firm* — Harness, Dickey & Pierce, PLC

(57) ABSTRACT

A method of charging a battery by a charging system comprising a master charging circuit and N (N is a natural number) slave charging circuits. The method includes: sourcing a first current to a single-wired bus by the master charging circuit; absorbing (sinking) a second current from the single-wired bus by the N slave charging circuits connected to the single-wired bus; identifying a single-wired bus voltage formed on the single-wired bus at a particular time point by the master charging circuit; and identifying the number of slave charging circuits based on the single-wired bus voltage by the master charging circuit.

10 Claims, 10 Drawing Sheets

MULTI-CONFIGURABLE SWITCH MODE CHARGING SYSTEM, CHARGING CIRCUIT, AND CHARGING METHOD

CROSS REFERENCE TO RELATED APPLICATION

This application claims priority from Korean Patent Application No. 10-2016-0091227, filed on Jul. 19, 2016, which is hereby incorporated by reference for all purposes as if fully set forth herein.

BACKGROUND OF THE INVENTION

1. Field of the Invention

The present invention relates to a charging technology. More particularly, the present invention relates to a multi-configurable switch mode charging technology.

2. Description of the Prior Art

FIG. 1 is a block diagram illustrating a generally used Universal Serial Bus (USB) charging system.

A USB charging system (20) receives power from a USB host (10) and charges a battery BAT within the USB charging system (20).

The USB charging system (20) is connected to the USB host (10) through four cables, wherein one of the four cables corresponds to a power bus Vbus that receives charging power and another cable corresponds to a ground line GND for adjusting a ground level. Further, the remaining two cables of the four cables correspond to data buses Dbus for transmitting data.

The USB charging system (20) acquires information on a maximum supply current from the USB host (10) through the data buses Dbus and charges the battery BAT within a range of the maximum supply current.

The USB charging system (20) internally includes a charging circuit (22) and charges the battery BAT through the charging circuit (22).

At this time, a charging time of the battery BAT is determined by a charging current (Ib). The battery BAT is rapidly charged when the charging current (Ib) supplied by the charging circuit (22) increases, and the battery BAT is slowly charged when the charging current (Ib) decreases.

The charging circuit (22) internally includes a power semiconductor and generates the charging current (Ib) through a switching operation of the power semiconductor. In terms of power conversion through the switching operation, the charging circuit (22) may be called a switch-mode charging circuit.

The switch-mode charging circuit tends to increase heat as the charging current (Ib) increases. Accordingly, there is a limitation in the charging current Ib that one charging circuit (22) can supply to the battery BAT, and thus the USB charging system (20) has a limitation in the charging time of the battery BAT due to the limitation.

In order to reduce the charging time, the USB charging system (20) may include two or more charging circuits (22).

At this time, since a total sum of the charging currents (Ib) output by the respective charging circuits (22) should not be larger than a maximum supply current that the USB host (10) can supply, each charging circuit (22) is required to control the maximum charging current in each charging circuit (22) through internal communication.

SUMMARY OF THE INVENTION

In this background, an aspect of the present invention is to provide a communication technology between charging circuits in a charging system including two or more charging circuits.

In accordance with an aspect of the present invention, a method of charging a battery by a charging system including a master charging circuit and N (N is a natural number) slave charging circuits is provided. The method includes: sourcing a first current to a single-wired bus by the master charging circuit; absorbing (sinking) a second current from the single-wired bus by the N slave charging circuits connected to the single-wired bus; identifying a single-wired bus voltage formed on the single-wired bus at a particular time point by the master charging circuit; and identifying the number of slave charging circuits based on the single-wired bus voltage by the master charging circuit.

In accordance with another aspect of the present invention, a charging system for charging a battery through a master charging circuit and N (N is a natural number) slave charging circuits is provided. The master charging circuit and the N slave charging circuits are communication-connected through a single-wired bus, the master charging circuit includes a single-wired master communication unit configured to supply (source) a first current to the single-wired bus and identify the number of slave charging circuits based on a single-wired bus voltage formed on the single-wired bus in a first mode, and to calculate a maximum charging current of each charging circuit according to the number of slave charging circuits and regulate the single-wired bus voltage according to the maximum charging current in a second mode, and the slave charging circuits include single-wired slave communication units configured to absorb (sink) a second current from the single-wired bus in the first mode and to identify the maximum charging current according to the single-wired bus voltage in the second mode.

In accordance with another aspect of the present invention, a master charging circuit for transmitting power received from a Universal Serial Bus (USB) host to N (N is a natural number) slave charging circuits connected in parallel is provided. The master charging circuit includes: a host communication unit configured to identify a maximum supply current of the USB host through data communication with the USB host; a single-wired master communication unit configured to communicate with the N slave charging circuits through a single-wired bus interface; and a power processing unit configured to control a charging current supplied to a battery through a power semiconductor, wherein the single-wired master communication unit identifies the number of slave charging circuits through the single-wired bus interface and controls the power processing unit based on a maximum charging current of each charging circuit determined according to the maximum supply current of the USB host and the number of slave charging circuits.

As described above, the present invention has an effect of efficiently performing communication between charging circuits in a charging system including two or more charging circuits. Particularly, the present invention has an advantage in that an interface between charging circuits is simplified through the use of a single-wire alone. Further, the present invention has an advantage in that circuits are simplified and a circuit area becomes small since communication between charging circuits is performed through analog circuits alone without any additional circuit for digital communication processing.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE EXEMPLARY EMBODIMENTS

Figure 1:
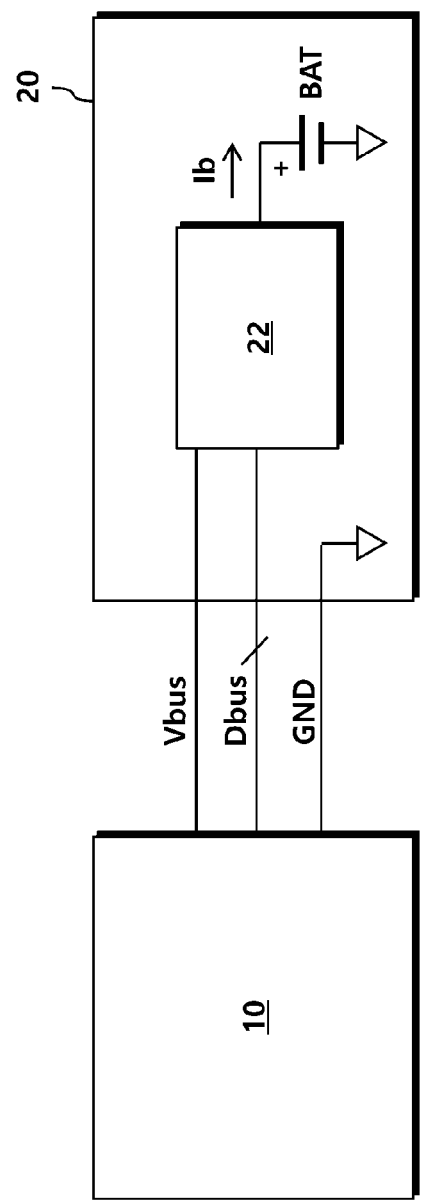
FIG. 1 is a block diagram illustrating a generally used Universal Serial Bus (USB) charging system.

Hereinafter, embodiments of the present invention will be described in detail with reference to the accompanying drawings. In adding reference numerals to elements in each drawing, the same elements will be designated by the same reference numerals, if possible, although they are shown in different drawings. Further, in the following description of the present invention, a detailed description of known functions and configurations incorporated herein will be omitted when it is determined that the description may make the subject matter of the present invention rather unclear.

In addition, terms, such as first, second, A, B, (a), (b) or the like may be used herein when describing components of the present invention. These terms are merely used to distinguish one structural element from other structural elements, and a property, an order, a sequence and the like of a corresponding structural element are not limited by the term. It should be noted that if it is described in the specification that one component is "connected," "coupled" or "joined" to another component, a third component may be "connected," "coupled," and "joined" between the first and second components, although the first component may be directly connected, coupled or joined to the second component.

Figure 2:
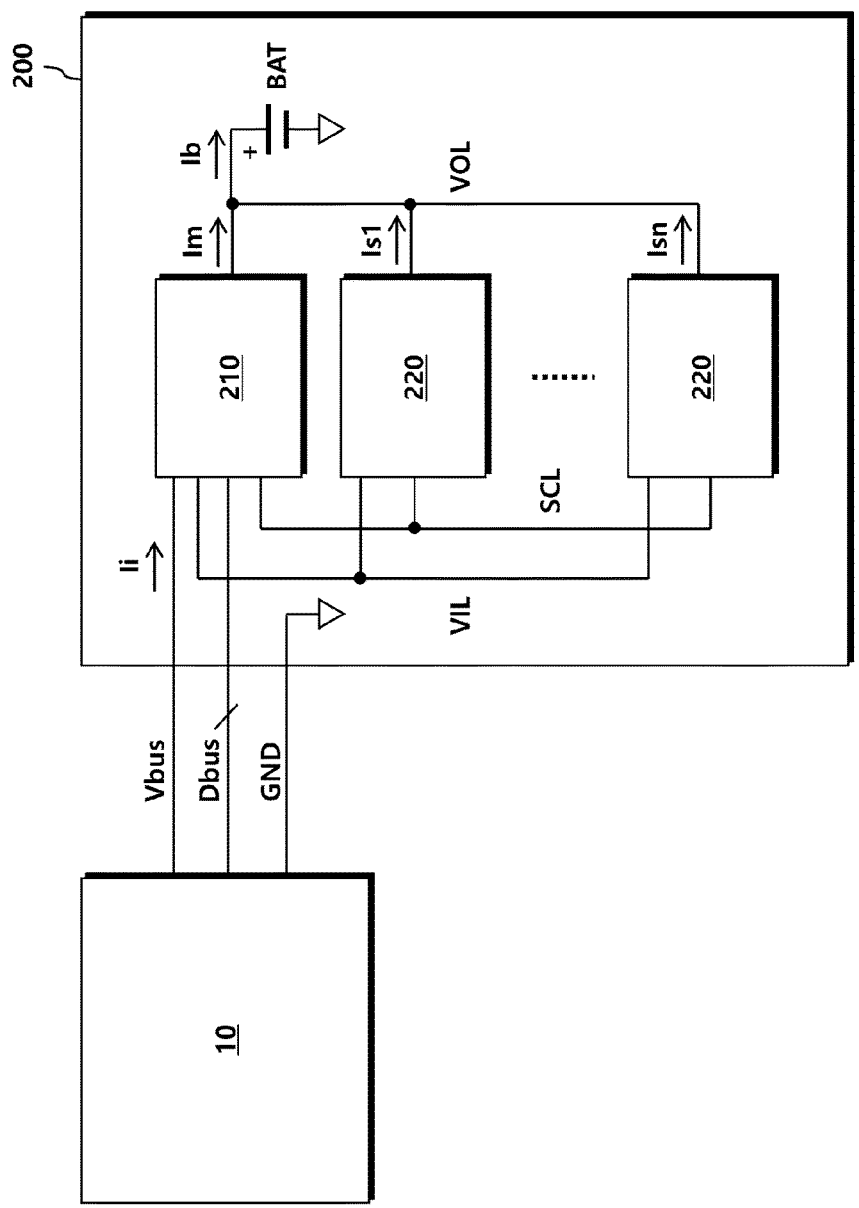
FIG. 2 schematically illustrates a configuration of a charging system according to an embodiment of the present invention.

FIG. 2 schematically illustrates a configuration of a charging system according to an embodiment of the present invention.

Referring to FIG. 2, a charging system (200) may include a master charging circuit (210) and N (N is a natural number) slave charging circuits (220).

The master charging circuit (210) is connected to the USB host (10) through a first power bus (Vbus) and a data bus (Dbus).

Further, the master charging circuit (210) is connected to the slave charging circuits (220) through a second power bus (VIL) (Voltage Input Line) and a single-wired bus (SCL) (Single-wired Communication Line) in an input side, and connected to the slave charging circuits (220) and the battery (BAT) through a third power bus (VOL) (Voltage Output Line) in an output side.

In the charging system (200), the battery charging current (Ib) supplied to the battery (BAT) is the same as a sum of charging currents (Im), and Is1 to Isn output from the respective charging circuits (210) and (220). Each charging circuit (210) or (220) may properly share and process the input current (Ii) supplied from the USB host (10) and thus increase the battery charging current (Ib). Accordingly, the charging system (200) may reduce the charging time of the battery (BAT).

The charging system (200) may perform data communication with the USB host (10) through the data bus (Dbus). Above all, the master charging circuit (210) of the charging system (200) is connected to the USB host (10) through the data bus (Dbus) and may perform data communication with the USB host (10).

The master charging circuit (210) may acquire information on a maximum supply current (IiMax) of the USB host (10) through the data bus (Dbus).

The charging system (200) charges the battery (BAT) within a range of the maximum supply current (IiMax) of the USB host (10). In other words, the charging system (200) may control each charging circuit (210 or 220) such that the input current (Ii) determined by the battery charging current (Ib) does not exceed the maximum supply current (IiMax) of the USB host (10).

Control information on each charging circuit (210 or 220) may be generated by the master charging circuit (210).

The master charging circuit (210) may determine a maximum charging current (IoMax) of each charging circuit (210 or 220) in consideration of the maximum supply current (IiMax) and the number of slave charging circuits (220), and transmit information on the maximum charging current (IoMax) to the slave charging circuits (220).

$$IoMax = \frac{IiMax}{N+1} \qquad \text{Equation (1)}$$

For example, a value generated by dividing the maximum supply current (IiMax) by a sum of the number N of slave charging circuits (220) and the number of master charging circuits (210) may be the maximum charging current (IoMax) as shown in Equation (1). The master charging circuit (210) may determine the maximum charging current (IoMax) of each charging circuit (210 or 220) as shown in Equation (1), and transmit the maximum charging current (IoMax) to the slave charging circuits (220) through the single-wired bus (SCL).

The master charging circuit (210) may identify the number of slave charging circuits (210) through a single-wired bus interface, and transmit the maximum charging current (IoMax) to the slave charging circuits (220).

Figure 3:
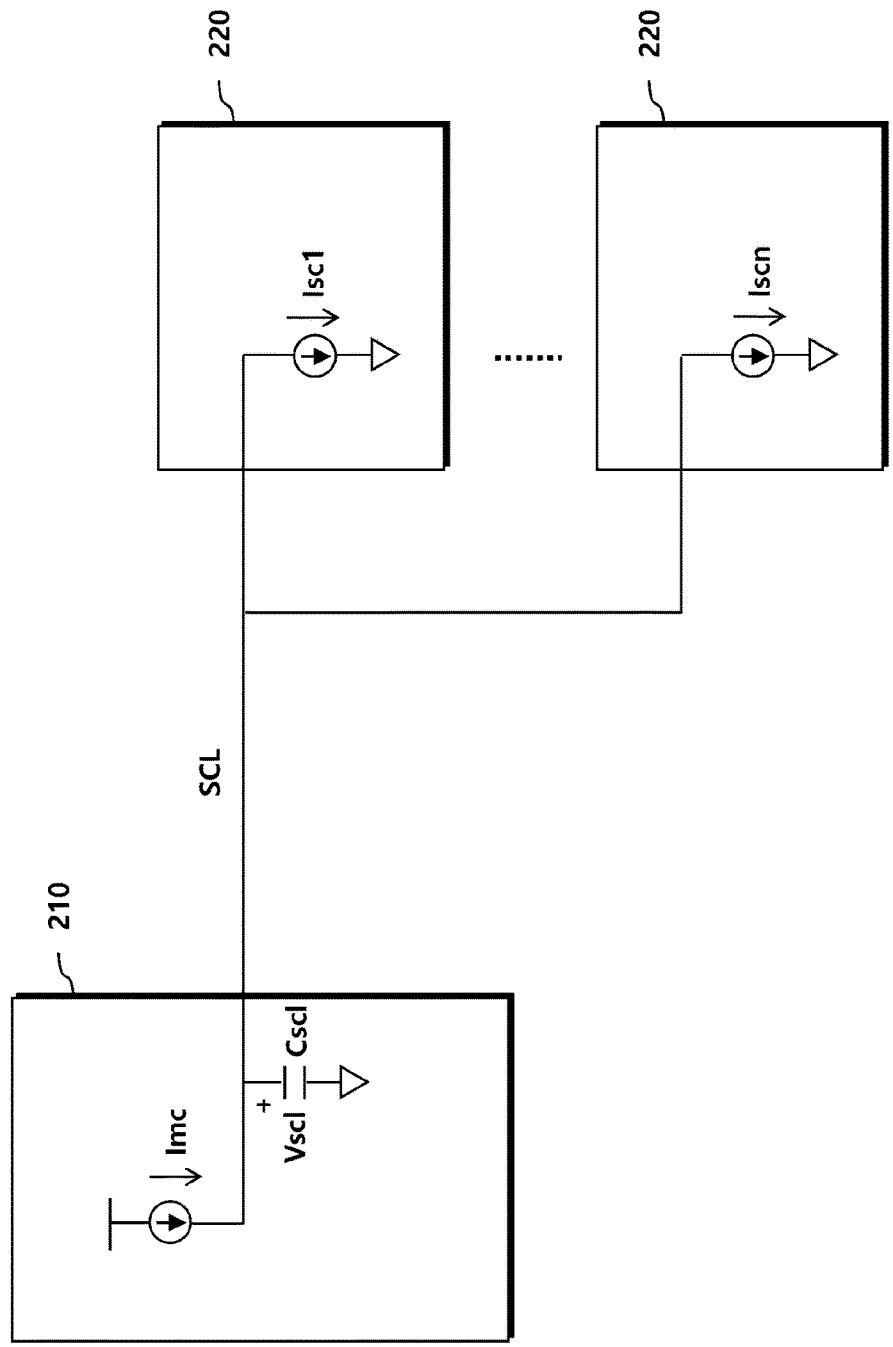
FIG. 3 schematically illustrates a configuration of the single wire bus interface for identifying the number of slave charging circuits.

FIG. 3 schematically illustrates a configuration of the single-wired bus interface for identifying the number of slave charging circuits.

In the mode (hereinafter, referred to as a "first mode") for identifying the number of slave charging circuits (220), the master charging circuit (210) supplies (sources) a first current (Imc) through the single-wired bus (SCL). Further, in the first mode, the slave charging circuits (220) absorb (sink) second currents (Isc1, . . . , and Iscn) from the single-wired bus (SCL).

At this time, a voltage (Vscl) (hereinafter, referred to as a "single-wired bus voltage") of a capacitor (Cscl) connected to the single-wired bus (SCL) is changed by the first current (Imc) and the second currents (Isc1, . . . , and Iscn), and the master charging circuit (210) may identify the number of slave charging circuits (220) by checking the single-wired bus voltage (Vscl) formed on the single-wired bus (SCL).

$$Vscl(t) = \frac{(Imc - (Isc1 + Isc2 + \ldots + Iscn)) \times t}{Cscl} \quad \text{Equation (2)}$$

For example, the single-wired bus voltage (Vscl) may be formed as shown in Equation (2), and the master charging circuit (210) may identify the number of slave charging circuits (220) by checking the single-wired bus voltage (Vscl) at a particular time point.

In a more detailed example, when the second currents (Isc1, . . . , and Iscn) absorbed by the respective slave charging circuits (220) are the same (Isc=Isc1= . . . =Iscn), the single-wired bus voltage (Vscl) may be as shown in the following equation.

$$Vscl(t) = \frac{(Imc - N \times Isc) \times t}{Cscl} \quad \text{Equation (3)}$$

$$N = \frac{Imc - \frac{Vscl(t) \times Cscl}{t}}{Isc}$$

In Equation (3), the single-wired bus voltage (Vscl) formed in the capacitor (Cscl) is determined by the first current (Imc) and the N second currents (Isc). The master charging circuit (210) may identify the number of slave charging circuits (220) based on Equation (3).

Figure 4:
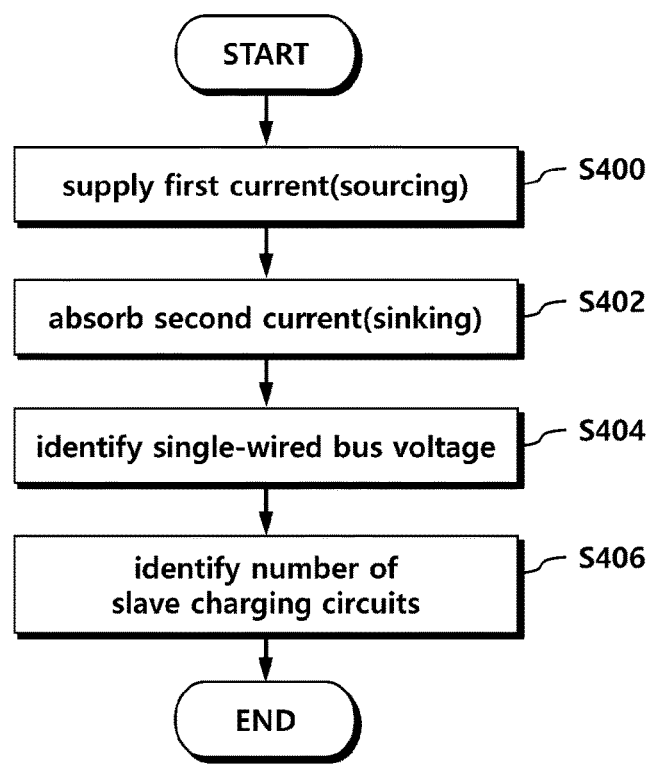
FIG. 4 is a flowchart illustrating a method of identifying the number of slave charging circuits according to an embodiment.

FIG. 4 is a flowchart illustrating a method of identifying the number of slave charging circuits according to an embodiment.

Referring to FIG. 4, the master charging circuit (210) supplies the first current (Imc) to the single-wired bus (SCL) in S400. Further, the N slave charging circuits (220) absorb the second currents (Isc1, . . . , and Iscn) from the single-wired bus (SCL) in S402.

When the voltage (Vscl) of the single-wired bus (SCL) is changed by the first current (Imc) and the second currents (Isc1, . . . , and Iscn), the master charging circuit (210) identifies the single-wired bus voltage (Vscl) formed on the single-wired bus (SCL) in S404.

Further, the master charging circuit (210) identifies the number of slave charging circuits (220) based on the single-wired bus voltage (Vscl) in S406.

When the number of slave charging circuits (220) is identified through such a process, the master charging circuit (210) transmits information on the maximum charging current (IoMax) to each slave charging circuit (220).

The master charging circuit (210) transmits the information on the maximum charging current (IoMax) to the slave charging circuits (220) through the single-wired bus (SCL).

The master charging circuit (210) may calculate the maximum charging current (IoMax) of each charging circuit (210 or 220) according to the number of slave charging circuits (220), and regulate the single-wired bus voltage (Vscl) according to the maximum charging current (IoMax).

Figure 5:
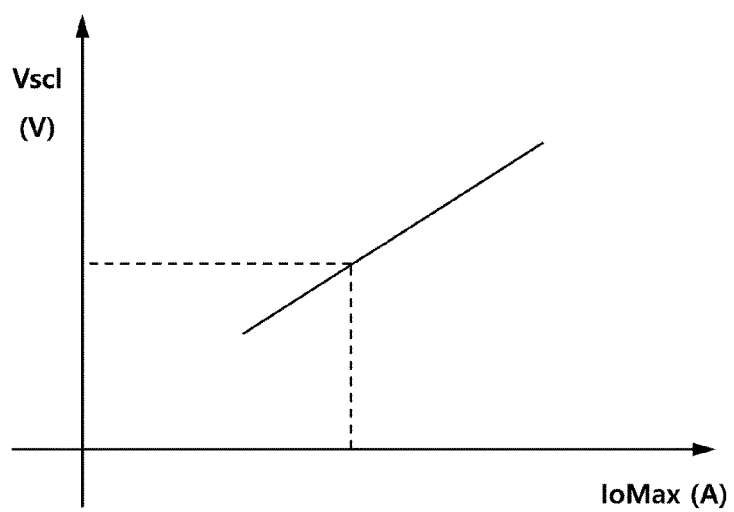
FIG. 5 is an example of a graph showing a relation between the single wire bus voltage and the maximum charging current.

FIG. 5 is an example of a graph showing a relation between the single-wired bus voltage and the maximum charging current.

The single-wired bus voltage (Vscl) and the maximum charging current (IoMax) may have a 1:1 correspondence relation. Based on the relation, the master charging circuit (210) may regulate the single-wired bus voltage (Vscl) to correspond to the calculated maximum charging current (IoMax). Further, the slave charging circuits (220) may acquire information on the maximum charging current (IoMax) through the single-wired bus voltage (Vscl).

In a process of acquiring the maximum charging current (IoMax), the slave charging circuits (220) may not include an Analog to Digital Converter (ADC) circuit. On the single-wired bus (SCL), the single-wired bus voltage (Vscl) corresponding to the maximum charging current (IoMax) has an analog voltage, and the slave charging circuits (220) may use the analog voltage as it is or convert it in an analog manner and use it as a control signal.

Figure 6:
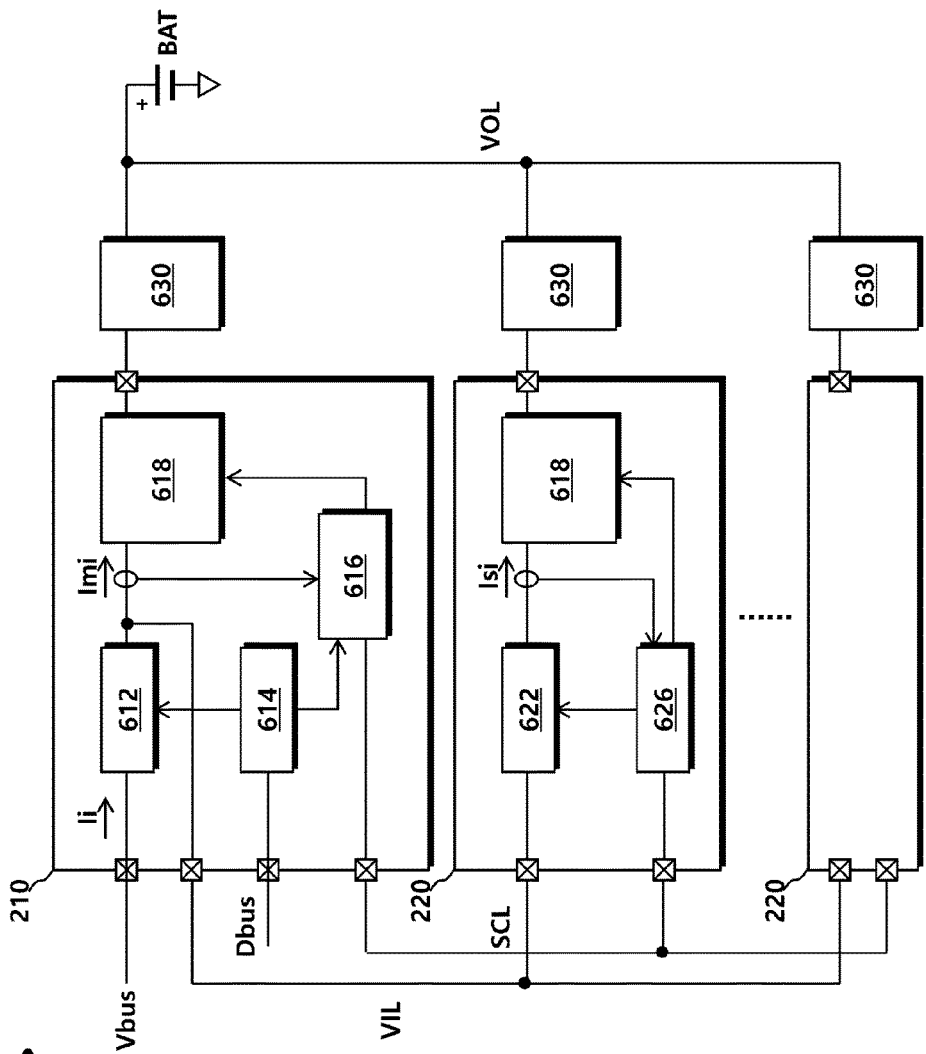
FIG. 6 schematically illustrates interval configurations of the master charging circuit and the slave charging circuits according to an embodiment.

FIG. 6 schematically illustrates interval configurations of the master charging circuit and the slave charging circuits according to an embodiment.

Referring to FIG. 6, the master charging circuit (210) may include a master protection circuit (612), a host communication unit (614), a single-wired master communication unit (616), and a power processing unit (618).

Further, the slave charging circuits (220) may include a slave protection circuit (622), a single-wired slave communication unit 626, and a power processing unit (618).

The host communication unit (614) performs data communication with the USB host (10) while being connected to the data bus (Dbus). The host communication unit (614) may transmit and receive various pieces of information to and from the USB host (10), and one of the various pieces of information may include information on the maximum supply current (IiMax) that can be supplied to the charging system (200). The information on the maximum supply current (IiMax) that can be supplied to the charging system (200) may be used for calculating the maximum charging current of each charging circuit (210 or 220) by the single-wired master communication unit (616).

The power processing unit (618) corresponds to a circuit for controlling the charging current supplied to the battery (BAT) through a power semiconductor.

Figure 7:
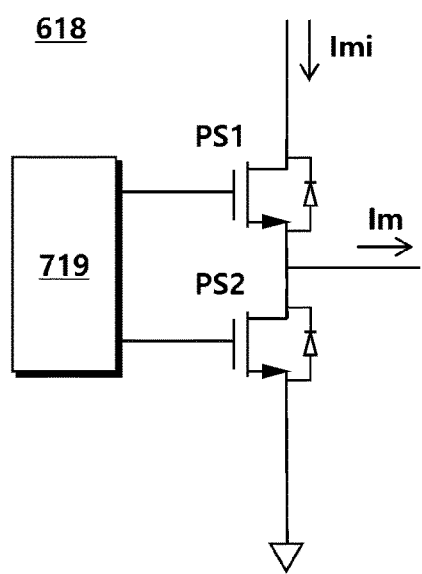
FIG. 7 illustrates an example of an internal configuration of the power processing unit located in the master charging circuit of FIG. 6.

FIG. 7 illustrates an example of an internal configuration of the power processing unit located in the master charging circuit of FIG. 6.

Referring to FIG. 7, the power processing unit (618) may include two power semiconductors (PS1 and PS2) and a gate driver (719) for controlling on/off of the power semiconductors (PS1 and PS2).

The gate driver (719) may turn on/off the power semiconductors (PS1 and PS2) in a Pulse Width Modulation (PWM) scheme. A master input current (Imi) input to the power processing unit (618) may be chopped by the turning on/off, and thus the size of the output current (Im) may be controlled.

In order to convert power through the power semiconductors (PS1 and PS2), an inductor device is actually further required and the inductor may be located outside the charging circuits (210 and 220) as an external circuit. In the embodiment of FIG. 6, the inductor may be located within a filter circuit (630) connected to an output terminal of each charging circuit (210 or 220).

Although the buck type power conversion circuit is illustrated in FIG. 7, another type power conversion circuit may be applied to the power processing unit (618). For example, a boost type power conversion circuit or a buck-boost type power conversion circuit may be applied to the power processing unit (618).

Meanwhile, the power processing unit (618) may be current-controlled or voltage-controlled.

The battery (BAT) may be charged in a current control scheme up to a predetermined voltage, and when arriving at the predetermined voltage, may be charged in a voltage control scheme. Accordingly, the power processing unit (618) may be current-controlled up to a predetermined voltage, and when arriving at the predetermined voltage, may be voltage-controlled.

Referring back to FIG. 6, the single-wired master communication unit (616) may sense the master input current (Imi) input to the power processing unit (618) and generate a control signal for the power processing unit (618) based on the sensed current. The single-wired slave communication unit (626) may also sense the slave input current (Isi) input into the power processing unit (618) and generate a control signal for the power processing unit (618) based on the sensed current.

More specifically, the single-wired slave communication unit (626) may constitute a current control loop by comparing the sensed slave input current (Isi) and a reference current signal, and the reference current signal may come from the single-wired bus voltage (Vscl). For example, the reference current signal may increase when the single-wired bus voltage (Vscl) increases, and the reference current signal may decrease when the single-wired bus voltage (Vscl) decreases. When the reference current signal increases, the size of the charging current output from the slave charging circuits (220) may increase.

Through such a manner, the single-wired slave communication unit (626) may control the charging currents of the slave charging circuits (220) according to the single-wired bus voltage (Vscl).

The single-wired master communication unit (616) located in the master charging circuit (210) and the single-wired slave communication unit (626) located in the slave charging circuit (220) may be connected through a single-wired bus SCL interface.

Figure 8:
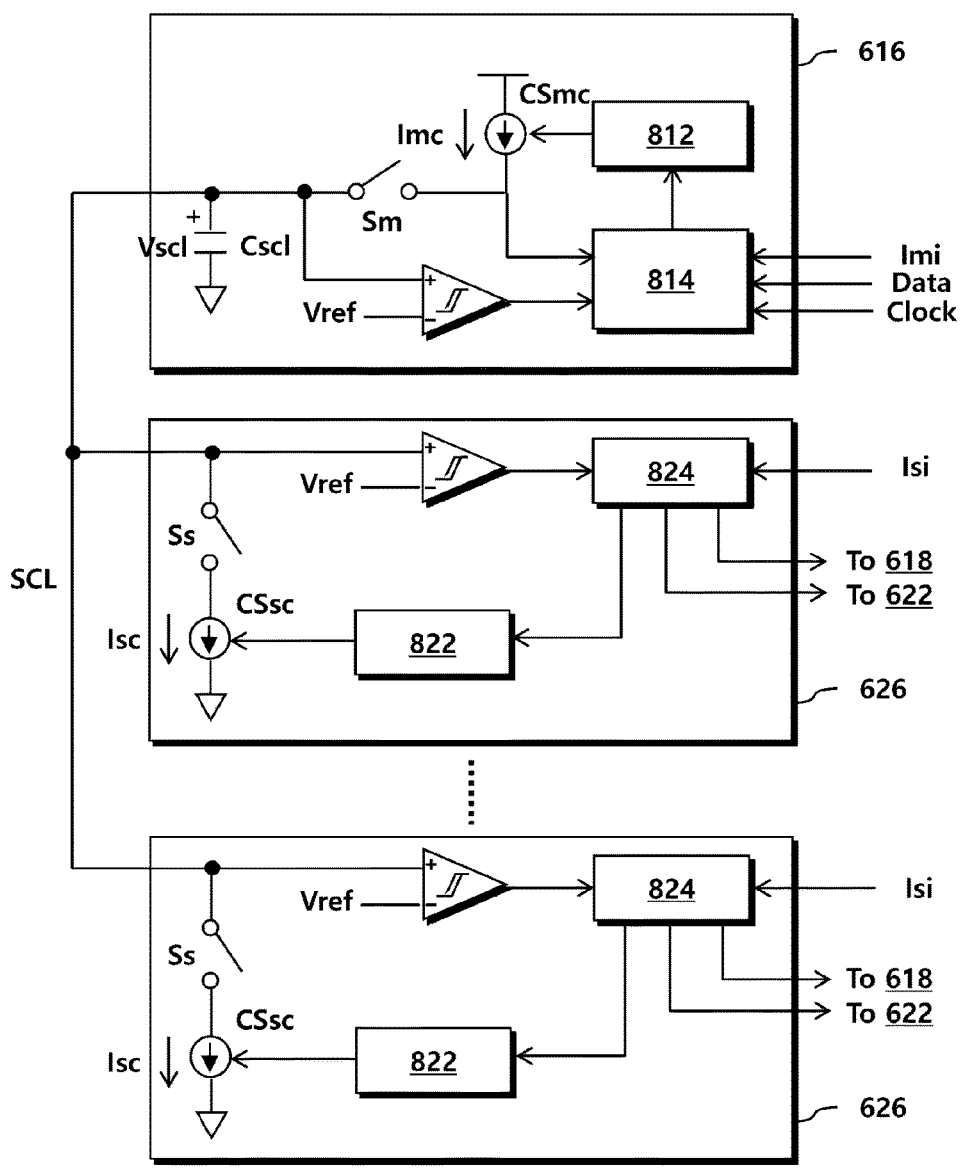
FIG. 8 illustrates an example of internal configurations of the single wire master communication unit and the single wire slave communication units.

FIG. 8 illustrates an example of internal configurations of the single-wired master communication unit and the single-wired slave communication units of FIG. 6.

Referring to FIG. 8, the single-wired master communication unit (616) may include a master current source (CSmc), a master current controller (812), and a master digital controller (814). Further, the single-wired slave communication unit (626) may include a slave current source (CSsc), a slave current controller (822), and a slave digital controller (824).

The master current source (CSmc) and the slave current source (CSsc) are connected to the single-wired bus (SCL). Further, the master current source (CSmc) supplies the first current (Imc) to the single-wired bus (SCL), and the slave current source (CSsc) absorbs the second current (Isc) from the single-wired bus (SCL).

The master current source (CSmc) is connected to the single-wired bus (SCL) through a first switch (Sm). Further, the single-wired master communication unit (616) may control the connection of the master current source (CSmc) to the single-wired bus (SCL) by controlling the first switch (Sm).

The slave current source (CSsc) is connected to the single-wired bus (SCL) through a second switch (Ss). Further, the single-wired slave communication unit (626) may control the connection of the slave current source (CSsc) to the single-wired bus (SCL) by controlling the second switch (Ss).

The slave current source (CSsc) may be or may not be connected to the single-wired bus (SCL) according to the mode. For example, in the mode (first mode) for identifying the number of slave charging circuits (220), the slave current source (CSsc) may be connected to the single-wired bus (SCL). In contrast, in a mode (second mode) for transmitting information on the maximum charging current (IoMax) to the slave charging circuits (220) through the single-wired bus voltage (Vscl), the slave current source (CSsc) may not be connected to the single-wired bus (SCL).

The master current controller (812) may control an amount of the first current (Imc) supplied by the master current source (CSmc). Further, the slave current controller (822) may control an amount of the second current (ISc) supplied by the slave current source (CSsc).

The master digital controller (814) may receive the single-wired bus voltage (Vscl) formed in the capacitor (Cscl) through a comparator. Further, the master digital controller (814) may receive a master input current (Imi) supplied to the power processing unit (618), maximum supply current information (Data) transmitted from the host communication unit (614), and a clock signal (Clock).

The master digital controller (814) may identify the single-wired bus voltage (Vscl) formed at a particular time point based on the single-wired bus voltage (Vscl) and the clock signal (Clock) and identify the number of slave charging circuits (220) based on the single-wired bus voltage. At this time, the master digital controller (814) may include an Analog to Digital Converter (ADC) circuit for converting the single-wired bus voltage (Vscl) into a digital signal.

The master digital controller (814) calculates the maximum charging current (IoMax) based on the identified number of slave charging circuits (220) and the maximum supply current information (Data) transmitted from the host communication unit (614).

The master digital controller (814) regulates the single-wired bus voltage (Vscl) according to the calculated maximum charging current (IoMax).

The slave digital controller (824) may receive the single-wired bus voltage (Vscl) through a comparator and receive the slave input current (Isi) supplied to the power circuit unit (618).

The slave digital controller (824) may generate a control signal for the maximum charging current (IoMax) according to the received single-wired bus voltage (Vscl) and transmit the control signal to the power circuit unit (618).

Meanwhile, the slave digital controller (824) may transmit a control signal for preventing an over current to the slave protection circuit (622) according to the slave input current (Isi).

Referring back to FIG. 6 in connection with the protection circuit, the master charging circuit (210) may include the master protection circuit (612), and the slave charging circuit (220) may include the slave protection circuit (622).

The slave protection circuit (622) is located at an input terminal of the current connected to the second power bus (VIL) and may perform an over current protection function for the current input to the slave charging circuit (220).

The slave protection circuit (622) may not have an over voltage protection function. The over voltage protection function may be performed by the master protection circuit (612).

The master charging circuit (210) may receive power from the USB host (10) through the first power bus (Vbus) and supply power to the slave charging circuits (220) through the second power bus (VIL). The master protection circuit (612) may be located in a path through the power is supplied. More specifically, the master protection circuit (612) may be located between the first power bus (Vbus) and the second power bus (VIL).

Since voltage of the first power bus (Vbus) and the second power bus (VIL) are substantially the same, a result of the over voltage protection function performed by the master protection circuit (612) may influence the slave charging circuits (220).

The master protection circuit (612) is located between the first power bus (Vbus) and the second power bus (VIL) and performs the over voltage protection function and the over current protection function according to a control signal.

Meanwhile, operations of each charging circuit (210 or 220) may be divided according to various modes.

Figure 9:
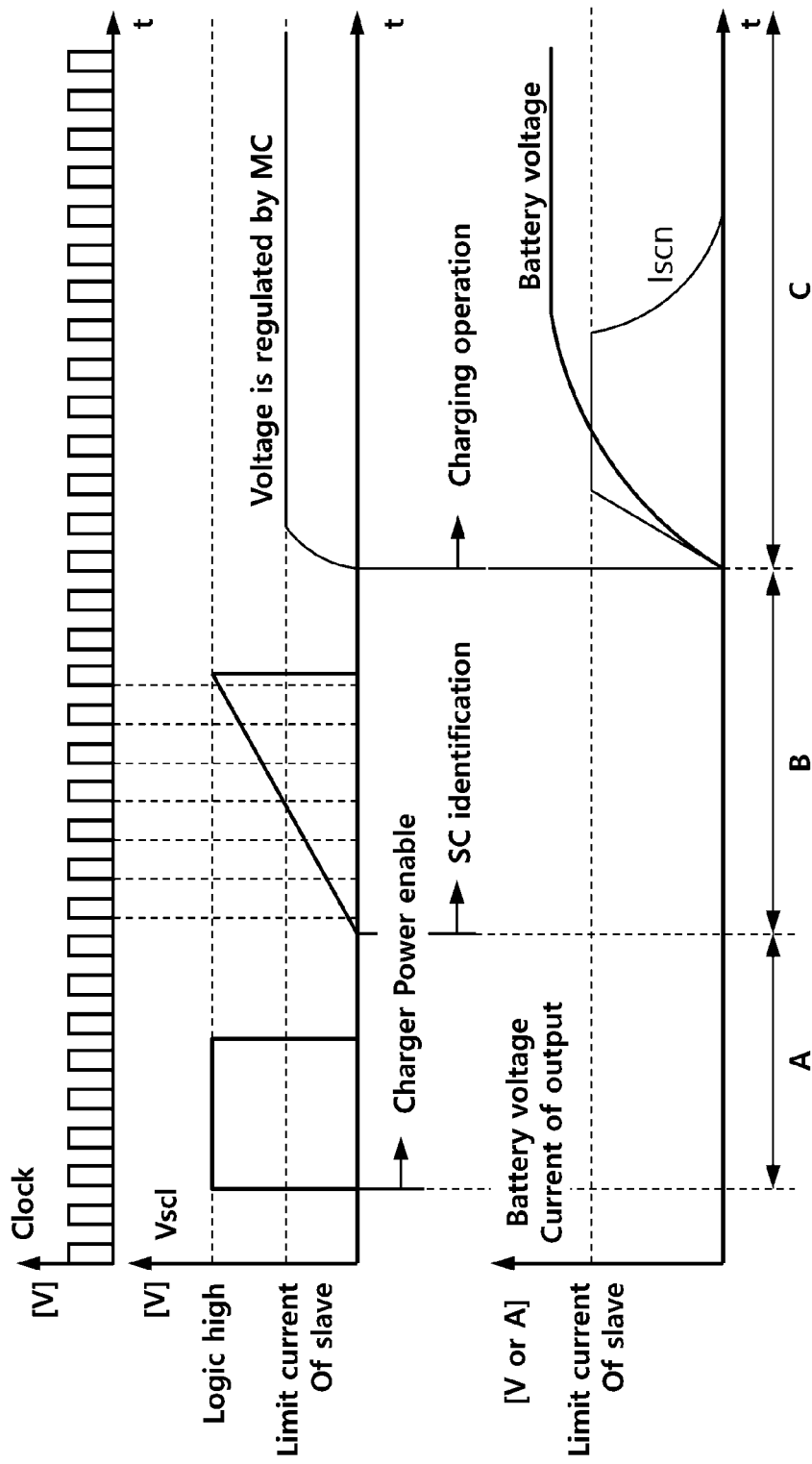
FIG. 9 illustrates the single wire bus voltage, the charging current, and the charging voltage according to each mode.

FIG. 9 illustrates the single-wired bus voltage, the charging current, and the charging voltage according to each mode.

Referring to FIG. 9, the master charging circuit (210) and the slave charging circuit (220) may include three modes. For convenience of description, a first mode is referred to as an operation mode A, a second mode is referred to as a first mode B, and a third mode is referred to as a second mode C. Further, for convenience of description, the description will be made with reference to FIG. 8.

In the operation mode A, the master charging circuit (210) starts the operation and the single-wired master communication unit (616) included in the master charging circuit (210) makes the single-wired bus voltage (Vscl) logic high.

In the operation mode A, the slave charging circuit (220) recognizes that the single-wired bus voltage (Vscl) becomes logic high through a comparator and operates the slave current source (CSsc). When the slave current source (CSsc) operates, the single-wired bus voltage (Vscl) changes to be logic low.

When both the master charging circuit (210) and the slave charging circuit (220) operate through such a process, the master charging circuit (210) and the slave charging circuit (220) enters the first mode B corresponding to the next stage.

The first mode B corresponds to a mode in which the master charging circuit (210) identifies the number of slave charging circuits (220).

In the first mode B, the master charging circuit (210) operates the master current source (CSmc). In the first mode B, the slave charging circuit (220) continuously operates the slave current source (CSsc).

When the master current source (CSmc) operates in the first mode B, the single-wired bus voltage (Vscl) increases at a predetermined slope as shown in Equation (2). At this time, the master charging circuit (210) identifies the number of slave charging circuits (220) based on the clock signal and the single-wired bus voltage (Vscl). Further, in the first mode B, the master charging circuit (210) calculates the maximum charging current (IoMax) based on the number of slave charging circuits (220) and the maximum supply current (IiMax) that the USB host (10) can supply.

When the number of slave charging circuits (220) is identified, the master charging circuit (210) stops operating the master current source (CSmc) and enters the second mode C. At this time, the slave charging circuits (220) also stop operating the slave current sources (CSsc) and enter the second mode C.

The second mode C corresponds to a mode in which the master charging circuit (210) transmits information on the maximum charging current (IoMax) of each charging circuit to the slave charging circuits (220).

In the second mode C, the single-wired bus voltage (Vscl) is regulated only by the master charging circuit (210).

In the second mode C, the master charging circuit (210) regulates the single-wired bus voltage (Vscl) according to the maximum charging current (IoMax).

The second mode C also corresponds to a mode in which each charging circuit (210 or 220) performs charging.

In the second mode C, the slave charging circuits (220) charge the battery (BAT) while limiting the charging currents according to the single-wired bus voltage (Vscl).

When each charging circuit (210 or 220) initially charges the battery (BAT) in a current control scheme and the voltage of the battery (BAT) reaches a predetermined voltage, the battery (BAT) is charged in a voltage control scheme.

Figure 10:
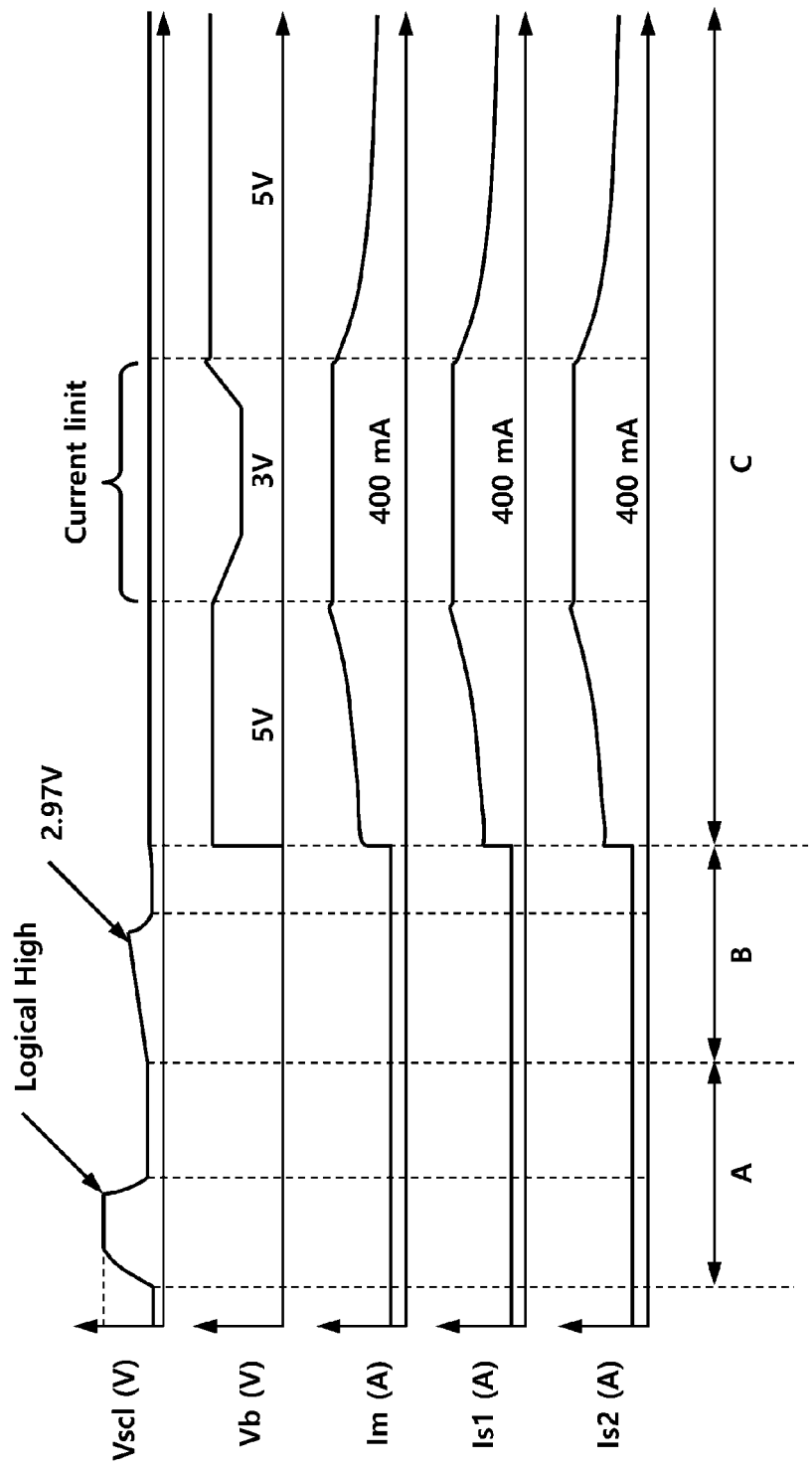
FIG. 10 illustrates simulation result waveforms of the charging system according to an embodiment.

FIG. 10 illustrates simulation result waveforms of the charging system according to an embodiment.

In FIG. 10, the maximum supply power (IiMax) that the USB host (10) can supply is set as 1.2 A. Further, the charging system (200) includes one master charging circuit (210) and two slave charging circuits (220).

Referring to FIG. 10, the single-wired bus voltage (Vscl) becomes logic high by the master charging circuit (210) in the operation mode A. Thereafter, as the slave charging circuits (220) operate, the single-wired bus voltage (Vscl) becomes logic low.

As the operation mode A ends and the first mode B starts, the single-wired bus voltage (Vscl) increases, and the master charging circuit (210) identifies the number of slave charging circuits (220) and calculates the maximum charging current (IoMax) based on the single-wired bus voltage (Vscl).

When the first mode B ends and the second mode C starts, the charging current of each charging circuit (210 or 220) gradually increases and reaches the maximum charging current (IoMAx). Further, when the battery (BAT) is charged with the maximum charging current (IoMax) for a predetermined time and the voltage of the battery (BAT) reaches a predetermined voltage, each charging circuit (210 or 220) controls the battery (BAT) in a voltage control scheme.

The charging system, the charging method, and the charging circuit according to an embodiment of the present invention have been described.

An embodiment of the present invention has an effect of reducing heat of each charging circuit and increasing charging currents by parallelizing charging current paths through a multi-configurable charging circuit, thereby reducing the charging time of the battery.

Further, according to an embodiment, when each charging circuit is configured as an Integrated Circuit (IC), it is possible to minimize the number of IC pins through single-wired bus communication (single-wired communication). In addition, since the charging system according to an embodiment does not use a digital communication scheme, circuits of the IC can be very simply configured. When the circuits of the IC are simply configured, an effect of reducing an IC area and costs is created.

Moreover, an embodiment of the present invention has an advantage in that an over voltage protection function has to be included in only the master charging circuit based on a structure in which the master charging circuit distributes the voltage and the current of the first power bus to slave charging circuits. Accordingly, the present invention has an advantage in that the size of a die becomes small since the slave charging circuits do not have to have the over voltage protection function.

In addition, since terms, such as "including," "comprising," and "having" mean that one or more corresponding components may exist unless they are specifically described to the contrary, it shall be construed that one or more other components can be included. All the terms that are technical, scientific or otherwise agree with the meanings as understood by a person skilled in the art unless defined to the contrary. Common terms as found in dictionaries should be interpreted in the context of the related technical writings not too ideally or impractically unless the present invention expressly defines them so.

Although a preferred embodiment of the present invention has been described for illustrative purposes, those skilled in the art will appreciate that various modifications, additions and substitutions are possible, without departing from the scope and spirit of the invention as disclosed in the accompanying claims. Therefore, the embodiments disclosed in the present invention are intended to illustrate the scope of the technical idea of the present invention, and the scope of the present invention is not limited by the embodiment. The scope of the present invention shall be construed on the basis of the accompanying claims in such a manner that all of the technical ideas included within the scope equivalent to the claims belong to the present invention.

What is claimed is:

1. A charging system for charging a battery through a master charging circuit and N (N is a natural number) slave charging circuits, the master charging circuit and the N slave charging circuits being communication-connected through a single-wired bus, the master charging circuit comprising a single-wired master communication unit configured to supply (source) a first current to the single-wired bus and identify the number of slave charging circuits based on a single-wired bus voltage formed on the single-wired bus in a first mode, and to calculate a maximum charging current of each charging circuit according to the number of slave charging circuits and regulate the single-wired bus voltage according to the maximum charging current in a second mode, and the slave charging circuits comprising single-wired slave communication units configured to absorb (sink) a second current from the single-wired bus in the first mode and to identify the maximum charging current according to the single-wired bus voltage in the second mode.

2. The charging system of claim 1, wherein the master charging circuit further comprises a host communication unit configured to acquire information on a maximum supply current of a host through data communication with the host supplying power to the charging system, and the single-wired master communication unit calculates a maximum charging current of each charging circuit according to the maximum supply current and the number of slave charging circuits.

3. The charging system of claim 1, wherein the master charging circuit further comprises a capacitor connected to the single-wired bus, and the single-wired master communication unit identifies the number of slave charging circuits according to a voltage of the capacitor determined by the first current supplied to the single-wired bus and N second currents absorbed from the single-wired bus.

4. The charging system of claim 3, wherein the single-wired master communication unit identifies the number of slave charging circuits according to the voltage of the capacitor formed at a particular time point based on a clock signal.

5. The charging system of claim 1, wherein the master charging circuit further comprises a protection circuit configured to receive power from a host through a first power bus and to supply power to the slave charging circuits through a second power bus and located between the first power bus and the second power bus.

6. A master charging circuit for transmitting power received from a Universal Serial Bus (USB) host to N (N is a natural number) slave charging circuits connected in parallel, the master charging circuit comprising:
a host communication unit configured to identify a maximum supply current of the USB host through data communication with the USB host;
a single-wired master communication unit configured to communicate with the N slave charging circuits through a single-wired bus interface; and
a power processing unit configured to control a charging current supplied to a battery through a power semiconductor,
wherein the single-wired master communication unit identifies the number of slave charging circuits through the single-wired bus interface and controls the power processing unit based on a maximum charging current of each charging circuit determined according to the maximum supply current of the USB host and the number of slave charging circuits.

7. The master charging circuit of claim 6, wherein a capacitor is connected to the single-wired bus, the single-wired master communication unit supplies a first current to the single-wired bus and each slave charging circuit absorbs (sinks) a second current from the single-wired bus in a first mode, and a single-wired bus voltage as shown in an equation of $$\text{single-wired bus voltage}(t) = \frac{(\text{first current} - N \times \text{second current}) \times t}{\text{capacitor capacity}}$$

is formed on the single-wired bus.

8. The master charging circuit of claim 7, wherein the single-wired master communication unit identifies the number of slave charging circuits according to the single-wired bus voltage identified at a particular time point based on a clock signal.

9. The master charging circuit of claim 7, wherein the single-wired master communication unit regulates the single-wired bus voltage according to the maximum charging current and each slave charging circuit controls the maximum charging current according to the single-wired bus voltage in a second mode.

10. The master charging circuit of claim 6, further comprises over voltage and over current protection circuits configured to receive power from the USB host through a first power bus and to transmit power to the slave charging circuits through a second power bus and located between the first power bus and the second power bus, further comprises over voltage and over current protection circuits configured to receive power from the USB host through a first power bus and to transmit power to the slave charging circuits through a second power bus and located between the first power bus and the second power bus.

* * * * *